United States Patent [19]

Kennedy

[11] 3,837,004

[45] Sept. 17, 1974

[54] SCAN CONVERSION WITH MAGNETIC DRUM OR DISC

[75] Inventor: Paul G. Kennedy, Monroeville, Pa.

[73] Assignee: Westinghouse Electric Corporation, Pittsburgh, Pa.

[22] Filed: Dec. 21, 1972

[21] Appl. No.: 317,332

[52] U.S. Cl. .................................. 358/11, 360/9
[51] Int. Cl. .................................. H04r 9/42
[58] Field of Search ......... 178/5.4 R, 5.4 C, 5.4 CD

[56] References Cited

UNITED STATES PATENTS

| | | | |
|---|---|---|---|
| 3,689,690 | 9/1972 | Tan | 178/5.4 C |
| 3,758,708 | 9/1973 | Yumde et al. | 178/5.4 C |

*Primary Examiner*—Robert L. Richardson
*Attorney, Agent, or Firm*—M. P. Lynch

[57] ABSTRACT

A scan conversion system for a sequential type color T.V. camera is employed to convert the sequential produced color video signals into simultaneous color video signals for use by an encoder at a desired rate. The vertical scan deflection control for the camera is added with a harmonically oscillated signal whereby the scanning of the picture field occurs in a direction perpendicular to the desired scan direction. The resulting waveform is sampled as many times per scan line as the ratio of the scan field rate in the camera to the display field rate for use by an encoder. The sampled waveforms are distributed to magnetic recording heads uniformly positioned around the periphery of spaced recording tracks of a magnetic recording means. One magnetic head from each track is used to read out the composite waveform at the standard rate of 60 fields per second, while the video signals actually occur at a rate of, for example, 180 fields per second. The recording means, in one form, consist of four tracks on a magnetic recorder with three recording heads per track. In another form, the recording means consist of three tracks on a magnetic recorder with two recording heads per track.

18 Claims, 7 Drawing Figures

SCAN CONVERSION WITH MAGNETIC DRUM OR DISC

BACKGROUND OF THE INVENTION

The present invention relates to a unique method of scanning target elements in a sequential type color tube of a television camera to produce sequential video signals that undergo a conversion with aid of magnetical recording means to provide the standard simultaneous three color video signals.

The standard red, green and blue color video signals are produced by T.V. camera systems that take at least two different forms. One camera system relates to the use of a so-called simultaneous camera wherein there are actually three cameras used to simultaneously produce three video signals representing the red, green and blue components during scanning of a picture. These signals are received in a simultaneous manner by an encoder for transmission in a well-known manner. This invention pertains to a sequential color television camera wherein a single camera tube is used to sequentially provide electrical signals responsive to red, green and blue fields in the picture. Such sequential cameras require the use of a tri-element color wheel that rotates in front of the camera to filter out the separate red, green and blue color components making up the field of picture during use of the camera.

Since color video signals delivered to an encoder must be in a simultaneous timed relation, a conversion system must be employed to process the sequential red, green and blue signals into a simultaneous output. A magnetic drum or disc-type recorder has been employed in the past to convert sequential time related signals into a simultaneous output.

When the tri-element color filter in front of the camera lens rotates at the standard speed of 60 revolutions per second, then the magnetic recording drum or disc is usually designed to rotate at 60 revolutions per second so that the sequentially received red, green and blue video signals can be processed for simultaneous encoding and broadcasting. This arrangement gives rise to serious color errors that are particularly acute and unacceptable when there is motion in the picture. For example, a rapidly moving object which sweeps across the picture field will produce a "breaking up" of the color due to the loss of certain color components of both the object and the field section immediately adjacent the path of the object. This is due to the fact that the separate color components that make up any given point on the picture field including the rapidly moving object, have been obtained over a period of time equal to 1/30 of a second, bearing in mind the interlacing characteristic of the National Television Systems Committee (NTSC) standard for color transmission and the sequential scanning procedure of the camera. Such errors could be reduced even to a point of non-detection by the human eye if a reduction in the time required to scan the field was obtained. A reduction of the total scan time to 1/90 of a second would render the color error negligible and insignificant, and require a camera field rate of 180 cycles per second due to the interlaced scanning pattern.

SUMMARY OF THE INVENTION

The present invention provides a scan conversion system using a magnetic drum or disc to convert sequential color video signals during scanning by a camera tube at a high rate, for example, of 180 fields per second, to 60 fields per second simultaneous video signals of red, green and blue fields of a picture.

The present invention provides a scan conversion method for a sequential type T.V. camera comprising the steps of: producing a plurality of simultaneous video signals for each color during sequential scanning of the three colors making up picture field sections arranged one after another within the field of a T.V. camera; recording at least some of the simultaneous video signals during sequential scanning of the three colors; and selecting for simultaneous use by an encoder three video color signals making up the field sections in their original ordered arrangement in the field.

The method according to the present invention in other terms provides a scan conversion system comprising the steps of sequentially scanning targets in the field of a picture in the direction perpendicular to the desired scan direction, scanning targets in the field of the picture in the desired scan direction, forming video signals from samplings of the resulting waveform taken as many times per scan line as the ratio of the actual field scanning rate to desired field scanning rate, distributing the video signals to magnetic recording heads uniformly positioned around the recording track of a magnetic recorder, and using the magnetic recording heads to produce simultaneous video signals corresponding to the sequentially received red, green and blue sampled fields.

More specifically, the method according to the present invention provides for using a plurality of stationary recording heads for each of a plurality of recording tracks to receive video signals of picture information occurring at a rate of 180 fields per second, arranging the recording heads at uniformly fixed locations about the recording track, and using one magnetic head from each track at prescribed track locations to read from each recording track simultaneous video signals at a desired rate for use by a standard encoder.

In one form the apparatus for controlling scanning the field of a picture in a direction perpendicular to the desired scan comprises oscillator means producing a signal frequency superimposed upon the vertical deflection scan control signal for sampling picture elements at intervals vertically below a first scan target before proceeding with the scanning of a second target horizontally adjacent the first target. The apparatus additionally comprises, magnetic recording means including a plurality of recording heads, and gate means operated by the vertical deflection and oscillator signals for controlling video signals associated with the recording means to convert the sequential color video signals into simultaneous video color signals.

These features and advantages of the present invention as well as others will be more apparent when the following description is read in light of the accompanying drawings, in which.

Figures 1, 6, 7:
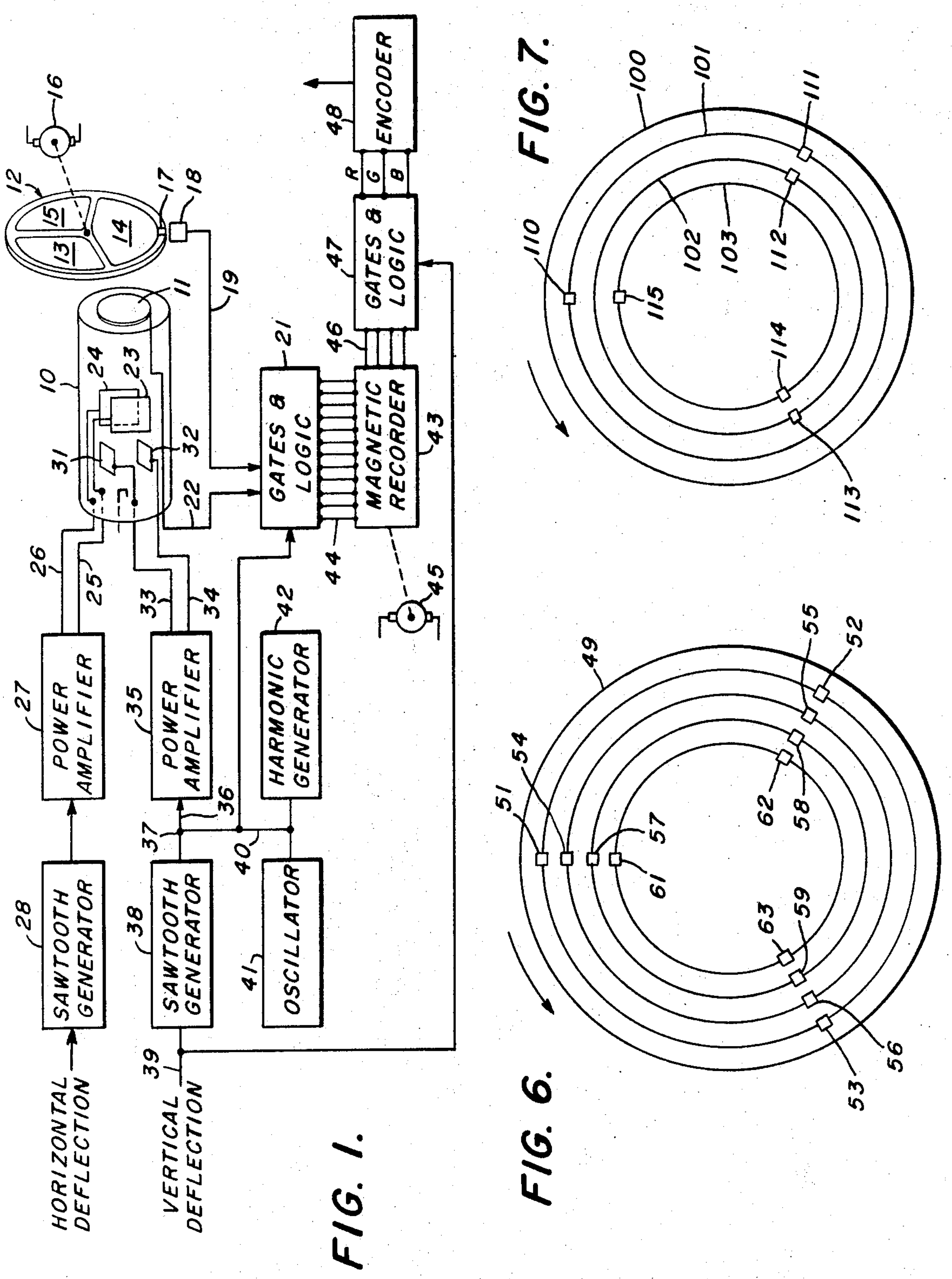
FIG. 1 is a schematic view of a sequential-type T.V. camera scanning system embodying the features of the present invention.
FIG. 6 is a plan view of a disc-type magnetic recording devide illustrating the magnetic recording tracks and heads to carry out the read and write schedules according to FIG. 4.
FIG. 7 is a plan view of a disc-type magnetic recording device illustrating the magnetic recording tracks and heads to carry out the read and write scedule according to FIG. 5.

With reference now to FIG. 1, there is schematically illustrated a sequential type T.V. color camera including a color tube 10 having a photosensitive surface 11 that receives filtered light passing through a tricolor filter wheel 12. The wheel 12 consists of equal segments of a red filter 13, a green filter 14 and a blue filter 15. The wheel is coupled to a drive motor 16 for rotation at a preselected constant speed such as, for example, 3,600 revolutions per minute. A magnetic slug 17 in the rim of the wheel actuates a sensor 18 to provide a pulse in line 19 representing the instantaneous position of the filter segments with respect to the camera tube surface 11. The signal in line 19 is fed to gates and logic circuitry 21 which also receives along a line 22 sequential video signals from the surface 11 of the camera tube.

Figures 2, 3, 4, 5:
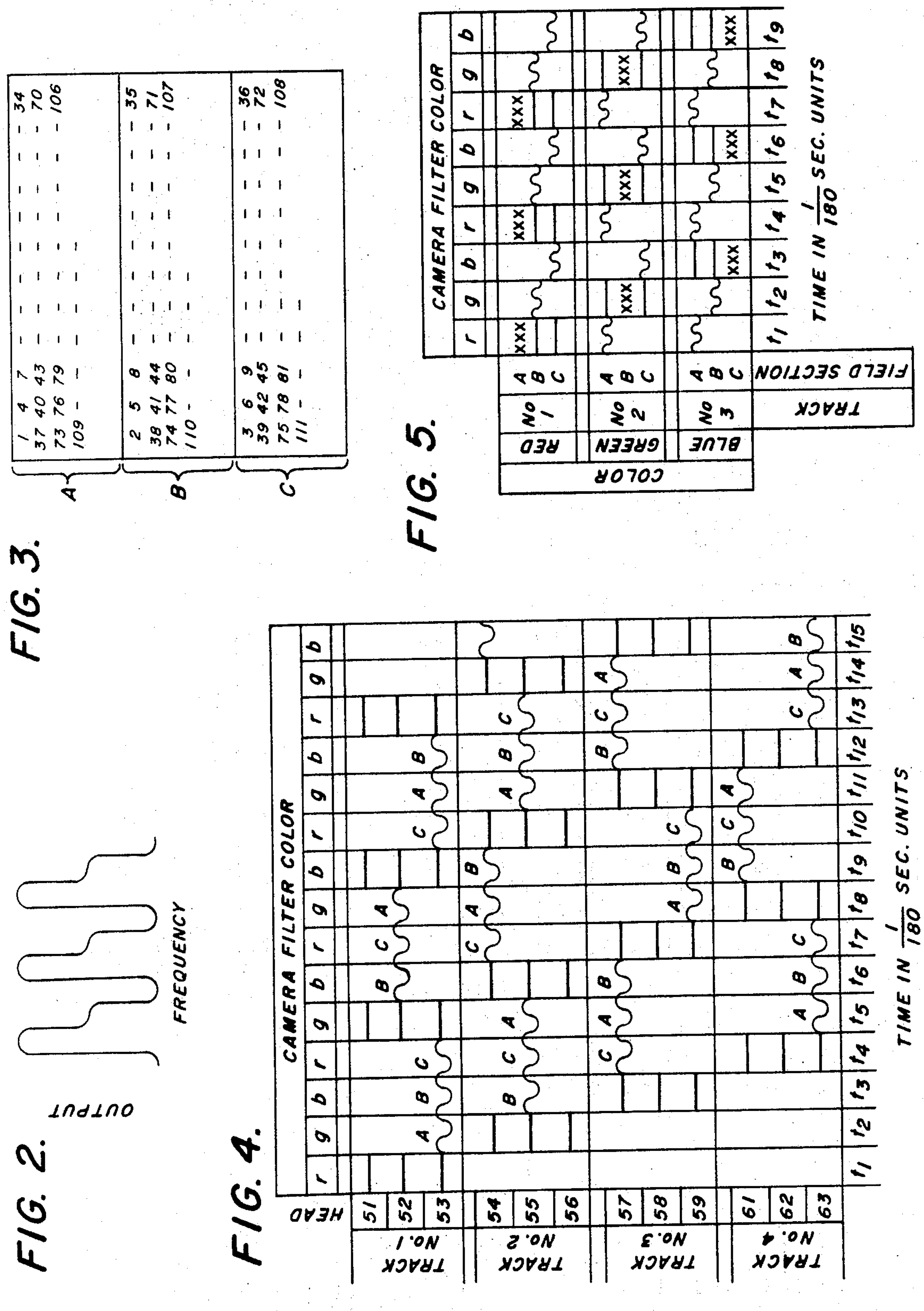
FIG. 2 is a typical waveform of an oscillating signal combined with the sawtooth waveform of the vertical deflection scan control generator.
FIG. 3 illustrates, in simplified form, the field sampling sequence according to the present invention.
FIG. 4 is a read and write schedule for one embodiment of a magnetic recording device.
FIG. 5 is a read and write schedule for a second embodiment of a magnetic recording device.

The camera tube has spaced, parallel horizontal deflection plates 23 and 24 connected by lines 25 and 26, respectively, to a power amplifier 27. This amplifier is modulated by a horizontal deflection control signal modulated by a sawtooth generator 28. The camera tube also includes spaced, parallel vertical deflection plates 31 and 32 that are connected by lines 33 and 34, respectively, to a power amplifier 35. This amplifier receives a modulation signal in a line 36 from a summation point 37. This point is connected to a sawtooth generator 38 used to modulate vertical deflection control signal in line 39. Point 37 is also connected to line 40 receiving the summation signal from an oscillator 41 and a harmonic generator 42. The signal transmitted by line 40 takes the waveform of a harmonically modulated sine wave having a frequency, for example, of 8 megacycles per second or up to 12.5 megacycles per second. The waveform illustrated in FIG. 2 is the second harmonic sine wave signal in line 40. Those skilled in the art will appreciate that third and even fourth harmonic modulations of the sine wave may be employed without departing from the spirit of the present invention. Control of the gates and logic circuitry 21 occurs in response to the combined signal in line 40 and the tricolor filter position signal in line 19.

For the purpose to be discussed in greater detail hereinafter, the gates and logic circuitry 21 are connected to a magnetic recorder 43 by a plurality of lines 44. The exact number of lines is based on the number of recording heads employed in the magnetic recorder. FIG. 6 illustrates a first embodiment wherein twelve heads are used, and FIGS. 7–11 illustrate a second embodiment wherein six recording heads are used. The magnetic recorder 43 is driven by a constant speed motor 45. Lines 46 connect the output signals from the recorder to a gates and logic circuitry 47. This circuitry is operated in response to the vertical deflection control signal received along line 39 to arrange and deliver simultaneous color video signals R, G and B to an encoder 48.

In order to more fully appreciate the underlying concept of the present invention, reference is made to FIG. 3 wherein the field of the camera is intended to be represented by overall rectangular outline in the figure. This field is divided, for the purposes of illustration only, into field sections A, B and C arranged vertically below one another. Each block in FIG. 3 represents one nyquist interval and the numbering of the blocks represent the sampling sequence. Thus, the picture field is scanned by focusing on the target represented by block 1 in field section A and then focusing on the target represented by block 2 in field section B followed by focusing on the target represented by block 3 in field section C. The scanning continues by scanning the target represented by block 4 in field section A, which is horizontally adjacent block 1, followed by the focusing on target 5 in field section B, followed by focusing on target 6 of field section C. Thus, the scanning continues in this manner until all the targets from the first row of the field section A have been scanned, which then is followed by scanning, in the just described manner, the second, third, fourth, etc. rows of targets in field section A. When the scanning of the entire field section A has been completed, it actually turns out to be a complete scanning of all the targets in field sections B and C but in one-third the time that usually is required to scan a field. In other words, the field illustrated by FIG. 3 is scanned at a rate of 180 cycles per second instead of the usual 60 cycles per second. This sequence for scanning the field follows in response to the horizontal land areas or dwell periods provided by the harmonically modulated sine wave illustrated by FIG. 2. Third and fourth harmonic modulations will result in a greater number of field sections. Wave forms other than a sine wave may be used to produce the intended result. For a field containing 90,000 nyquist intervals, the sampling sequence is 1, 30,001, 60,001; 2, 30,002, 60,002; 3, etc. This target scanning procedure is followed during the time when each of the tricolor filters assumes an aligned position in front of the camera tube, and according to the standard interleaving scanning process.

FIG. 4 illustrates the read-write schedule according to a first embodiment wherein the use of four tracks, No. 1, No. 2, No. 3 and No. 4, on a magnetic recorder are employed for the conversion of the sequentially received video signals into a simultaneous red, green and blue video output signal for use by an encoder. For illustration purposes only, in FIG. 7 the recorder takes the form of a disc 49 onto which there is defined magnetic recording tracks 1–4 by arranging on each track equally spaced magnetic recording heads 51, 52, 53 for track No. 1; 54, 55, 56 for track No. 2; 57, 58, 59 for track No. 3; and 61, 62, 63 for track No. 4. Let it be assumed that the disc 49 rotates in a counterclockwise direction as indicated by the arrow in FIG. 6 at 3,600 RPM. Let it further be assumed that it is the first instance of scanning by the camera, i.e., no prior recorded material on the disc, and that the red color filter is arranged in front of the photosensitive surface of the camera. It should be remembered that the gate and logic circuit 21 are operated pursuant to the signals in lines 19 and 40. In the readwrite schedule of FIG. 4, the solid horizontal line segments represent recording instances, and the wavy lines represent reading of the recorded signals. Under these conditions, the conversion of sequential to simultaneous signals occurs as follows:

At time $t_1$, write the red signals simultaneously for fields A, B and C on track 1 using heads 51, 52 and 53, respectively.

At time $t_2$, read the red signal from track 1 using head 53 for field A. Write the green video signals simultaneously for fields B, C and A on track 2 using heads 54, 55 and 56, respectively.

At time $t_3$, read the red signal for field B using head 53 from track 1, and read the green signal for field B on track 2 using head 54. Write the blue color signals simultaneously for fields C, A and B on track 3 using heads 57, 58 and 59, respectively.

At time $t_4$, read the red color signal for field C from track 1 using head 53; read the green color signal for field C from track 2 using head 55; read the blue color signal for field C from track 3 using head 57; and write red signals simultaneously for fields A, B and C on track 4 using heads 61, 62 and 63, respectively.

At time $t_5$, write the green signals simultaneously for fields B, C and A on track 1 using heads 51, 52 and 53, respectively; read the green signal for field A from track 2 using head 55; read the blue signal for field A from track 3 using head 57; and read the red signal for field A from track 4 using the head 63.

At time $t_6$, the blue signals for fields C, A and B are simultaneously recorded on track 2 using heads 54, 55 and 56, respectively; read the blue signal for field B from track 3 using head 57; read the red signal for field B from track 4 using head 63; and read the green signal for field B from track 1 using head 52.

At time $t_7$, write the red signals simultaneously for fields A, B and C on track 3 using heads 57, 58 and 59, respectively; read the red signal for field C from track 4 using head 63; read the green signal for field C from track 1 using head 52; and read the blue signal for field C from track 2 using head 54.

At time $t_8$, write the green signal simultaneously for fields B, C and A on track 4 using heads 61, 62 and 63, respectively; read the green signal for field A from track 1 using head 52; read the blue signal for field A from track 2 using head 54; and read the red signal for field A from track 3 using head 59.

At time $t_9$, the green signals are simultaneously recorded on track 1, and the color signals for field B are read from tracks 2, 3 and 4.

At time $t_{10}$, the red signals are simultaneously recorded on track 2 and the color signals for field C are read from tracks 1, 3 and 4.

The read-write schedule continues in the manner as already described providing the simultaneous output of three color signals for the field sections in their A, B and C sequence. As indicated in FIG. 4, the time periods $t_1$, $t_2$, etc. are each for a duration of 1/180 second time units. Three time units are required to provide the three color signals for the entire field which turns out to be 1/60 second and corresponds to the standard scan rate for use by encoders according to the NTSC specifications.

FIGS. 5 and 7 illustrate a second embodiment of a scan conversion system wherein a magnetic recording disc 100 is defined with three tracks 101, 102 and 103, each having two recording heads for a total of six heads. Track 101 has recording heads 110 and 111 which are separated in a clockwise direction by 120°. Track 102 has recording heads 112 and 113. Head 112 is radially spaced from head 111, and head 113 is spaced 120° in a clockwise direction from head 112. Track 103 has recording heads 114 and 115. Head 114 is radially spaced from head 113, and head 115 is positioned 120° in a clockwise direction from head 114.

The second embodiment of the present invention differs in one of its essential aspects from the first embodiment by the direct use of a color video signal of one field section. In other words, instead of recording the video signals for each of the three field sections onto the recording means and then immediately reading one of the field sections, the second embodiment provides the immediate use of one field section and the recording of the two remaining field sections for each color signal. Such a scan conversion system has the added advantage of reducing the number of heads required to a total of six as compared with the total of twelve heads required for the scan conversion systems described according to the first embodiment. For the purpose of describing the second embodiment of the present invention, let it be assumed that there is a given set of conditions which include that the disc 100 rotates in the direction indicated by the arrow in FIG. 7 at 3,600 revolutions per minute. Let it further be assumed that there is prior recorded color video signals on the disc and that a red color filter is arranged in front of the photosensitive surface 11 at time $t_1$ according to schedule of FIG. 5. In this schedule, the XXX represents the direct use of the color video signal. The wavy line indicates the reading of the color video signals, and the line segments indicate writing of the color video signals.

With reference now to FIGS. 5 and 7, the read-write schedule according to the second embodiment of the present invention provides that during time $t_1$, the red color video signal for field section A is used direct, and the red video signals for field sections B and C are simultaneously recorded on track 1 using heads 111 and 110, respectively. The green color video signal for field A is read from track 2 using head 112, and the blue video signal for field A is read from track 3 using head 114.

At time $t_2$, the green color filter is aligned in front of the camera. Read from track 1 the red color video signal for field section B using head 110, use directly the green color signal for field section B, and write on track 2 the green color signal for field sections A and C using heads 113 and 112, respectively. The blue video signal for field section B is read from track 3 using head 114.

During time $t_3$, the blue color filter is arranged in front of the camera, and the blue video signal for field section C is used direct. The red video signal is read from track 1 for field section C using head 110, the green color video signal is read from track 2 for field section C using head 112. The blue color video signal for field sections A and C are recorded on track 3 using heads 115 and 114, respectively.

During time $t_4$, the red color filter again passes in front of the camera tube, and the red video signal for field section A is used direct, and the signal for field sections B and C is recorded using heads 111 and 110, respectively. The green video signal for field section A is read from track 2 using head 112, and the blue video signal for field section A is read from track 3 using head 114.

The read-write schedule continues in this manner as each color filter passes in front of the camera, and during each instance the video signal for one field section is used direct by the operation of the gate and logic system 21 in a manner such that the signal passes directly to the gate and logic circuit 47. It will be noted in regard to FIG. 5 that three time periods of 1/180 second duration are required to deliver to the gate and logic circuit 47, the video signals for each of the three field sections. In other words, it takes three times 1/180 or 1/60 second to provide the color video signals for the field.

The unique method of scanning the field at the increased rate which according to the embodiment selected for description uses the second harmonic of the sine wave curve as illustrated in FIG. 2 and thereby provides a field scan rate at 180 cycles per second. The third harmonic and fourth harmonic signals, when added to the sine wave, will produce even greater scan rates. In order to compensate for the reduced exposure time of target elements in the camera in view of the unique scanning method, a shuttering of the camera will provide the desirable results. It is considered distinctly desirable to use stationary heads along with a single magnetic drum or disc rotating at a fixed speed for the conversion of sequential signals into a simultaneous color signal output.

The read-write schedules given by FIGS. 4 and 5 are based on prescribed writing of the video signals to give an ordered reading sequence through the use of the gate and logic circuitries 21 and 47. By a different arrangement of this circuitry, the read-write schedules can be based on an ordered writing to give a prescribed reading sequence for producing the simultaneous red, green and blue video signals for use by the encoder 48.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A scan conversion method for a sequential type T.V. camera comprising the steps of:

producing a plurality of simultaneous video signals for each color during sequential scanning of the three colors making up picture field sections vertically arranged one after another within the field of a T.V. camera, recording at least some of said simultaneous video signals during sequential scanning of the three colors and, selecting for simultaneous use by an encoder three video color signals making up the field sections in the original ordered arrangement.

2. A scan conversion method for a sequential type T.V. camera comprising the steps of:

scanning the field of a picture in a desired direction while scanning in a direction perpendicular thereto, to produce a field scan rate greater than a desired field scan rate;

producing sequential color video signals in response to said scanning the field of a picture, recording at least some of said sequential color video signals, and selecting three simultaneous color video signals representing a scanning of the field of a picture in a desired direction for use by an encoder.

3. The method of claim 2 wherein each of said sequential video signals are recorded on magnetic recording means by using a plurality of recording heads.

4. The method of claim 3 comprising the additional step of:

arranging said recording of said video signals on separate recording tracks each having a plurality of recording heads.

5. The method of claim 2 wherein two of said three sequential video signals are recording on magnetic recording means by using a plurality of recording heads.

6. The method of claim 5 comprising the additional step of:

arranging said recording of two of said three sequential video signals on separate recording tracks each having a plurality of recording heads.

7. The method of claim 2 wherein said scanning the field of a picture comprises the steps of sampling target elements at horizontally spaced intervals, and sampling target elements at vertically spaced intervals between sampling of horizontally spaced targets.

8. A scan conversion method for a sequential type color T.V. camera comprising the steps of:

scanning targets in the field of a picture in a direction perpendicular to the desired scan direction, scanning a target in the field of a picture in a desired scan direction after each scan of targets in the direction perpendicular thereto, forming video signals from samplings of the resulting waveform taken as many times per scan line as the actual field scanning rate to desired field scanning rate, distributing at last some of the video signals to magnetic recording heads, recording the video signals distributed to the recording heads, and selecting the recorded video signals in a predetermined sequence corresponding to a scanning of targets in a field of a picture at a desired field scanning rate.

9. The method of claim 8 comprising the additional step of:

rotating a tri-element color filter at a predetermined rate in the field of the picture during the scanning of targets in the field.

10. The method of claim 9 wherein each of said video signals are distributed to a magnetic recording head, the additional step comprising:

reading the selected video signal after recording by using one of the recording heads.

11. The method of claim 10 comprising the additional step of:

arranging in a stationary manner a plurality of recording heads at spaced locations on each of a plurality of tracks on a magnetic recording means.

12. The method of claim 9 wherein one less than the total number of said video signals are distributed to separate recording heads, the additional step comprising:

reading the selected video signal after recording by using one of the recording heads.

13. An apparatus for scanning the field of a picture by using a sequential color T.V. camera comprising:

horizontal deflection means for controlling horizontal scanning of the field of the camera;

vertical deflection means for controlling vertical scanning of the field of the camera;

means for producing a vertical deflection control signal;

means for superimposing an oscillating signal upon said vertical deflection control signal for scanning targets in field sections vertically arranged one after another between scanning of horizontally adjacent targets in one of the field sections, and conversion means for producing simultaneous video color signals from the output signals of the sequential color T.V. camera.

14. An apparatus according to claim 13 wherein said conversion means further comprise magnetic recording means including a plurality of recording heads arranged at spaced locations for each of a plurality of recording tracks.

15. An apparatus according to claim 14 wherein said conversion means further comprise gate means responsive to said oscillating signal for distributing at least some of the video output sinals from said T.V. camera to said recording means.

16. An apparatus according to claim 15 wherein said conversion means further comprise gate means responsive to said vertical deflection control signal for selecting color video signals from said recording means to produce said simultaneous color video signals.

17. An apparatus according to claim 16 further comprising a tri-element color filter passing within the field of the camera, means for rotating said filter for positioning sequentially each of the color filters, and means for producing a signal corresponding to the position of at least one of the color filters in relation to the camera.

18. An apparatus according to claim 17 wherein said gate means responsive to said oscillating signal are further responsive to said signal corresponding to the position of at least one of the color filter elements.

* * * * *